No. 774,196. PATENTED NOV. 8, 1904.
A. W. NUNN.
HOSE COUPLING.
APPLICATION FILED MAY 17, 1904.
NO MODEL.

WITNESSES: INVENTOR
Augustus W. Nunn
BY
Franklin N. Hough
Attorney

No. 774,196.

Patented November 8, 1904.

UNITED STATES PATENT OFFICE.

AUGUST W. NUNN, OF ROCHESTER, NEW YORK.

HOSE-COUPLING.

SPECIFICATION forming part of Letters Patent No. 774,196, dated November 8, 1904.

Application filed May 17, 1904. Serial No. 208,428. (No model.)

*To all whom it may concern:*

Be it known that I, AUGUST W. NUNN, a citizen of the United States, residing at Rochester, in the county of Monroe and State of New York, have invented certain new and useful Improvements in Hose-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in hose-couplers; and the object of the invention is to produce a device whereby couplings of various sizes may be connected together without threaded connections, thereby rendering it possible to easily and quickly connect different makes of hose-pipes for emergency or other purposes.

My invention consists in various details of construction and combinations and arrangements of parts, which will be hereinafter fully described and then specifically defined in the appended claims.

My invention is illustrated in the accompanying drawings, which, with the letters of reference marked thereon, form a part of this application, and in which—

Figure 1:
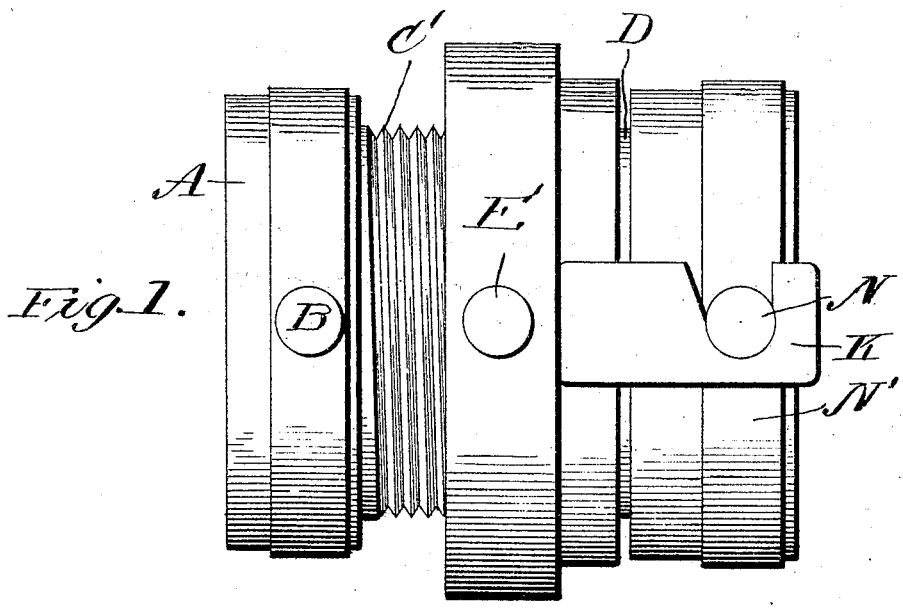
Figure 2:
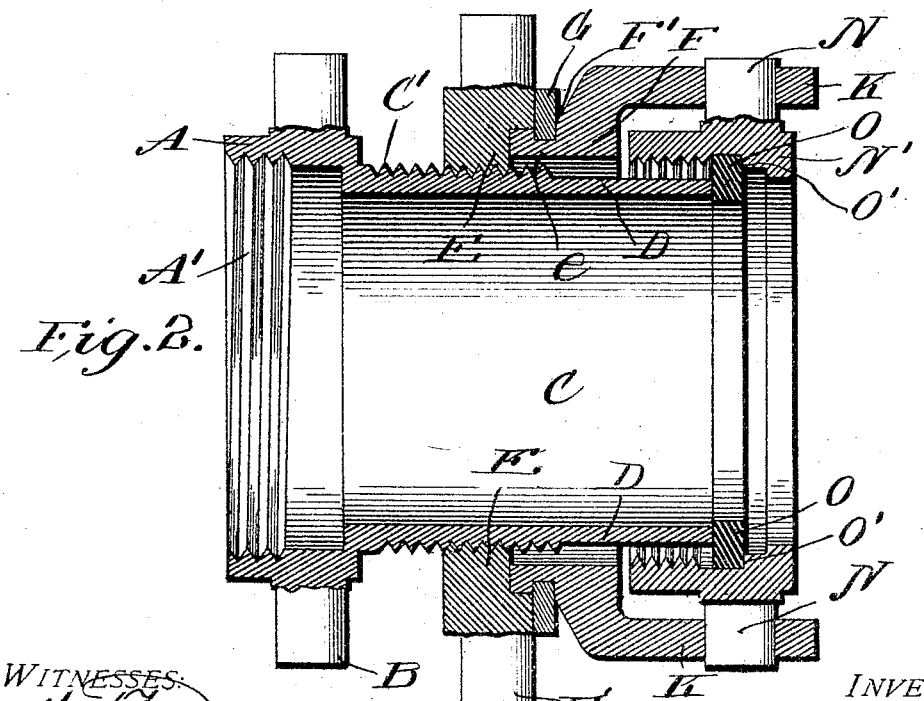

Figure 1 is an elevation showing two pipes connected together by my improved hose-coupling, and Fig. 2 is a vertical longitudinal section through the ends coupled together.

Reference now being had to the details of the drawings by letter, A designates a coupling adapted to be secured to a hydrant-plug and has interior threads A' and oppositely-disposed lugs B for attachment to a spanner, and projecting from the coupling A is a cylindrical shank portion C, having exterior circumferential threads C' extending a portion of its length and a plain unthreaded portion D beyond the threaded portion adjacent to the free end of said cylindrical portion. Mounted upon the threaded circumference of the cylindrical portion C is a ring E, having a central aperture the walls of which are threaded conforming to the threads C', and E' designates oppositely-disposed lugs for engagement with a spanner.

F designates a ring having an annular recess F' about its circumference, adjacent to one edge thereof, which is adapted to receive a flanged or circular ring G, which is integral with or secured to one edge of the ring E, as shown in the sectional view of the drawings. One face of said ring E is recessed out, as at *e*, to receive the end of the ring F intermediate said recess F' and the adjacent edge of the ring, and when so positioned the flange or ring G is disposed in the recess F', thereby swiveling the two rings E and F together. Projecting from the ring F at positions diametrically opposite are the hooks K, which are adapted to engage the diametrically opposite lugs N upon the end of a hose-coupling which is to be connected to the cylindrical portion C. Said lugs N project from the threaded coupling N', which is the common construction of fire-hose coupling, provided with a suitable gasket or washer O.

In coupling the ends of two sections of hose the portion of the cylinder C beyond the threads is adapted to be inserted instead of the coupling N' in the manner shown in the sectional view of the drawings, and the end of the cylindrical portion C is adapted to contact with the washer or gasket O, which rests against the shoulder O' on the coupler N', and in order to hold said cylindrical portion against the gasket the coupling-ring F is turned so that the hooks K will engage said lugs N upon the coupler N', and afterward the ring E is turned toward the coupler-head A, which will draw the swiveled ring F and also the coupler N' engaged thereby tightly against the end of the cylindrical portion C of the coupler A, thereby affording a secure and water-tight joint.

By the provision of a coupler embodying the features of my invention it will be noted that a simple and efficient means is provided for attaching hose which may be of different sizes and regardless of the different kinds of threads upon the coupling ends.

While I have shown a particular detailed construction of apparatus embodying the features of my invention, it will be understood that I may vary the same, if desired, as to details without in any way departing from the spirit of the invention.

While my invention is intended more particularly for use in making hydrant connections, it will be at once evident that it is also adapted for connecting together sections of hose, and it is also evident that the parts may be made reverse from those shown in the drawings.

Having thus fully described my invention, what I claim as new, and desire to secure by Letters Patent, is—

1. A hose-coupling comprising a hydrant connection having a contracted barrel portion, a portion of the circumference of which is threaded, a coupling-ring with interior threads mounted upon the threaded portion of the hydrant-coupling, a coupling-ring swiveled to said threaded ring, a hose-coupling with lugs diametrically opposite and adapted to be engaged by said hooks, a gasket seated on the shoulder on the inner face of said hose-coupling, and against which the barrel portion of the hydrant-coupling is adapted to contact, as set forth.

2. A hose-coupling comprising a hydrant connection having a contracted barrel portion, threaded about a portion of its circumference, a threaded ring fitted to said barrel portion and having diametrically opposite lugs, one face of said threaded ring being recessed, a ring G secured to the face of said threaded ring, the inner marginal edge of said ring G projecting over said recessed portion, a coupling-ring held in said recess by the ring G, and having diametrically opposite hooks, a hose-coupling with lugs diametrically opposite adapted to be engaged by said hooks, a gasket seated against the shoulder of said hose-coupling and against which the end of said barrel is adapted to contact, as set forth.

In testimony whereof I hereunto affix my signature in presence of two witnesses.

AUGUST W. NUNN.

Witnesses:
FRANK WALTER,
WILLIAM J. VORMENG.